(12) United States Patent
Moseley

(10) Patent No.: US 11,427,279 B2
(45) Date of Patent: Aug. 30, 2022

(54) SELF-LOCATING CONTROLS

(71) Applicant: Tactual Labs Co., New York, NY (US)

(72) Inventor: Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/936,796

(22) Filed: Jul. 23, 2020

(65) Prior Publication Data

US 2021/0024167 A1 Jan. 28, 2021

Related U.S. Application Data

(60) Provisional application No. 62/877,511, filed on Jul. 23, 2019.

(51) Int. Cl.
*B62K 23/02* (2006.01)
*B62K 11/14* (2006.01)

(52) U.S. Cl.
CPC .............. *B62K 23/02* (2013.01); *B62K 11/14* (2013.01)

(58) Field of Classification Search
CPC ................................. B62K 23/02; B62K 11/14
See application file for complete search history.

(56) References Cited

U.S. PATENT DOCUMENTS

| | | | | |
|---|---|---|---|---|
| 8,447,436 | B2* | 5/2013 | Molinaro | B62K 11/14 701/1 |
| 2012/0139336 | A1* | 6/2012 | Ledford | B62K 23/02 307/9.1 |
| 2018/0267653 | A1* | 9/2018 | Holman | G06F 3/0445 |
| 2018/0267667 | A1* | 9/2018 | De Araujo | G06F 3/0346 |
| 2019/0042032 | A1* | 2/2019 | Moseley | G06F 3/046 |

* cited by examiner

*Primary Examiner* — Vicky A Johnson
(74) *Attorney, Agent, or Firm* — Adam Landa

(57) ABSTRACT

A sensor system is able adjust control location and the type of controls based on the positioning of a user's hands. The sensor system is adapted to detect the positioning of a hand or body part and compensate for the changing positions of the hand or body part. When the positioning of the hand or body part changes, the controls that are able to be activated by the hand or body part also change and adapt to the location where the controls are activated, providing accessible and/or contextualized controls.

20 Claims, 10 Drawing Sheets

SELF-LOCATING CONTROLS

This Application claims the benefit of U.S. Provisional Application No. 62/877,511 filed Jul. 23, 2019, the contents of which are incorporated herein by reference.

FIELD

The disclosed systems relate in general to the field of controls, and in particular to controls that are able to adapt to the location of the user's hands.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

Figure 1:
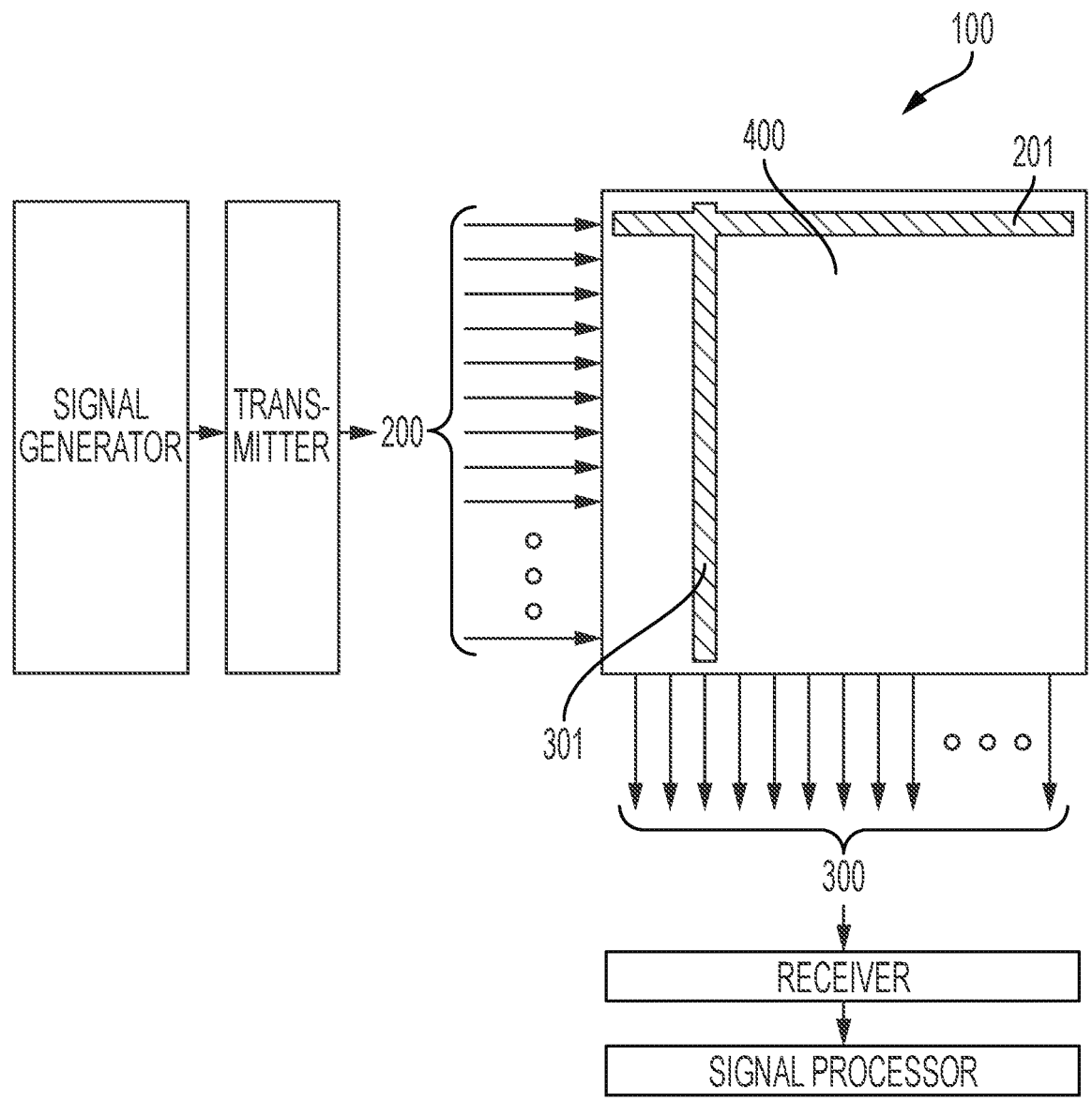
FIG. 1 is a schematic view of a sensor.

In various embodiments, the present disclosure is directed to sensor systems sensitive to hover, contact and pressure and their applications in real-world, artificial reality, virtual reality and augmented reality settings. It will be understood by one of ordinary skill in the art that the disclosures herein apply generally to all types of systems using self-locating controls that are able to detect, for example, hover, contact and pressure.

Throughout this disclosure, the terms "touch", "touches", "touch event", "contact", "contacts", "hover", or "hovers" or other descriptors may be used to describe events or periods of time in which a key, key switch, user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristics. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The present application contemplates various embodiments of sensors designed for implementation in touch control systems. The sensor configurations are suited for use with frequency-orthogonal signaling techniques (see, e.g., U.S. Pat. Nos. 9,019,224 and 9,529,476, and 9,811,214, all of which are hereby incorporated herein by reference). The sensor configurations discussed herein may be used with other signal techniques including scanning or time division techniques, and/or code division techniques. It is pertinent to note that the sensors described and illustrated herein are also suitable for use in connection with signal infusion (also referred to as signal injection) techniques and apparatuses.

The presently disclosed systems and methods involve principles related to and for designing, manufacturing and using capacitive based sensors, and particularly capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

Certain principles of a fast multi-touch (FMT) sensor have been disclosed in the patent applications discussed above. Orthogonal signals are transmitted into a plurality of transmitting conductors (or antennas) and the information received by receivers attached to a plurality of receiving conductors (or antennas), the signal is then analyzed by a signal processor to identify touch events. The transmitting conductors and receiving conductors may be organized in a variety of configurations, including, e.g., a matrix where the crossing points form nodes, and interactions are detected at those nodes by processing of the received signals. In an embodiment where the orthogonal signals are frequency orthogonal, spacing between the orthogonal frequencies, $\Delta f$, is at least the reciprocal of the measurement period $\tau$, the measurement period $\tau$ being equal to the period during which the columns are sampled. Thus, in an embodiment, a column may be measured for one millisecond ($\tau$) using frequency spacing ($\Delta f$) of one kilohertz (i.e., $\Delta f=1/\tau$).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as a measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to a gesture or movement. In other words, the measure corresponding to signal strength in a given bin would change as a result of some activity.

FIG. 1 illustrates certain principles of a fast multi-touch sensor 100 in accordance with an embodiment. At 200, a different signal is transmitted into each of the row conductors 201 of the touch surface 400. The signals are designed to be "orthogonal", i.e., separable and distinguishable from each other. At 300, a receiver is attached to each column conductor 301. The row conductors 201 and the column conductors 301 are conductors/antennas that are able to transmit and/or receive signals. The receiver is designed to receive any of the transmitted signals, or an arbitrary combination of them, with or without other signals and/or noise, and to individually determine a measure, e.g., a quantity for each of the orthogonal transmitted signals present on that column conductor 301. The touch surface 400 of the sensor comprises a series of row conductors 201 (not all shown) and column conductors 301 (not all shown), along which the orthogonal signals can propagate. In an embodiment, the row conductors 201 and column conductors 301 are arranged such that a touch event will cause a change in coupling between at least one of the row conductors and at least one of the column conductors. In an embodiment, a touch event will cause a change in the amount (e.g., magnitude) of a signal transmitted on a row conductor that is detected in the column conductor. In an embodiment, a touch event will cause a change in the phase of a signal transmitted on a row conductor that is detected on a column conductor. Because the touch sensor ultimately detects touch due to a change in the coupling, it is not of specific importance, except for reasons that may otherwise be apparent to a particular embodiment, the type of change that is caused to the touch-related coupling by a touch. As discussed above, the touch, or touch event does not require a physical touching, but rather an event that affects the coupled signal. In an embodiment the touch or touch event does not require a physical touching, but rather an event that affects the coupled signal in a repeatable or predictable manner.

With continued reference to FIG. 1, in an embodiment, generally, the result of a touch event in the proximity of both a row conductor 201 and column conductor 301 causes a change in the signal that is transmitted on a row conductor as it is detected on a column conductor. In an embodiment, the change in coupling may be detected by comparing successive measurements on the column conductor. In an embodiment, the change in coupling may be detected by comparing the characteristics of the signal transmitted on the row conductor to a measurement made on the column conductor. In an embodiment, a change in coupling may be measured by both by comparing successive measurements on the column conductor and by comparing known characteristics of the signal transmitted on the row conductor to a measurement made on the column conductor. More generally, touch events cause, and thus correspond to, measurements of the signals on the column conductors 301. Because the signals on the row conductors 201 are orthogonal, multiple row signals can be coupled to a column conductor 301 and distinguished by the receiver. Likewise, the signals on each row conductor 201 can be coupled to multiple column conductors 301. For each column conductor 301 coupled to a given row conductor 201 (and regardless of how touch affects the coupling between the row conductor and column conductor), the signals measured on the column conductor 301 contain information that will indicate which row conductors 201 are being touched simultaneously with that column conductor 301. The magnitude or phase shift of each signal received is generally related to the amount of coupling between the column conductor 301 and the row conductor 201 carrying the corresponding signal, and thus, may indicate a distance of the touching object to the surface, an area of the surface covered by the touch and/or the pressure of the touch.

In various implementations of a touch device, physical contact with the row conductors 201 and/or column conductors 301 is unlikely or impossible as there may be a protective barrier between the row conductors 201 and/or column conductors 301 and the finger or other object of touch. Moreover, generally, the row conductors 201 and column conductors 301 themselves are not in physical contact with each other, but rather, placed in a proximity that allows signal to be coupled there-between, and that coupling changes with touch. Generally, the row-column conductor coupling results not from actual contact between them, nor by actual contact from the finger or other object of touch, but rather, by the effect of bringing the finger (or other object) into proximity—which proximity results in a change of coupling, which effect is referred to herein as touch.

In an embodiment, the orientation of the row conductors and column conductors may vary as a consequence of a physical process, and the change in the orientation (e.g., movement) of the row conductors and/or column conductors with respect to one-another may cause a change in coupling. In an embodiment, the orientation of a row conductor and a column conductor may vary as a consequence of a physical process, and the range of orientation between the row conductor and column conductor includes ohmic contact, thus in some orientations within a range a row conductor and column conductor may be in physical contact, while in other orientations within the range, the row conductor and column conductor are not in physical contact and may have their coupling varied. In an embodiment, when a row conductor and column conductor are not in physical contact their coupling may be varied as a consequence of moving closer together or further apart. In an embodiment, when a row conductor and column conductor are not in physical contact their coupling may be varied as a consequence of grounding. In an embodiment, when a row conductor and column conductor are not in physical contact their coupling may be varied as a consequence of materials translated within the coupled field. In an embodiment, when a row conductor and column conductor are not in physical contact their coupling may be varied as a consequence of a changing shape of the row conductor or column conductor, or an antenna associated with the row conductor or column conductor.

The nature of the row conductors 201 and column conductors 301 is arbitrary and the particular orientation is variable. Indeed, the terms row conductor 201 and column conductor 301 are not intended to refer to a square grid, but rather to a set of conductors upon which signal is transmitted (rows) and a set of conductors onto which signal may be coupled (columns). (The notion that signals are transmitted on row conductors 201 and received on column conductors 301 itself is arbitrary, and signals could as easily be transmitted on conductors arbitrarily designated column conductors and received on conductors arbitrarily named row conductors, or both could arbitrarily be named something else.) Further, it is not necessary that row conductors and column conductors be in a grid. Other shapes are possible as long as a touch event will affect a row-column coupling. For example, the "rows" could be in concentric circles and the "columns" could be spokes radiating out from the center. And neither the "rows" nor the "columns" need to follow any geometric or spatial pattern, thus, for example, the keys on a keyboard could be arbitrarily connected to form row conductors and column conductors (related or unrelated to their relative positions.) Moreover, an antenna may be used as a row conductor, having a more defined shape than a simple conductor wire such as for example a row made from ITO). For example an antenna may be round or rectangular, or have substantially any shape, or a shape that changes. An antenna used as a row conductor may be oriented in proximity to one or more conductors, or one or more other antennas that act as columns. In other words, in an embodiment, an antenna may be used for signal transmission and oriented in proximity to one or more conductors, or one or more other antennas that are used to receive signals. A touch will change the coupling between the antenna used for signal transmission and the signal used to receive signals.

It is not necessary for there to be only two types signal propagation channels: instead of row conductors and column conductors, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antennas or conductors may be used rather than just "rows" and "columns." Many alternative embodiments are possible and will be apparent to a person of skill in the art after considering this disclosure. It is likewise not necessary for there to be only one signal transmitted on each transmitting media. In an embodiment, multiple orthogonal signals are transmitted on each row. In an embodiment, multiple orthogonal signals are transmitted on each transmitting conductor or antenna.

Returning briefly to FIG. 1, as noted above, in an embodiment the touch surface 400 comprises a series of row conductors 201 and column conductors 301, along which signals can propagate. As discussed above, the row conductors 201 and column conductors 301 are oriented so that, when they are not being touched the signals are coupled differently than when they are being touched. The change in signal coupled between them may be generally proportional or inversely proportional (although not necessarily linearly proportional) to the touch such that touch is measured as a gradation, permitting distinction between more touch (i.e., closer or firmer) and less touch (i.e., farther or softer)—and even no touch.

At 300, a receiver is attached to each column conductor 301. The receiver is designed to receive the signals present on the column conductors 301, including any of the orthogonal signals, or an arbitrary combination of the orthogonal signals, and any noise or other signals present. Generally, the receiver is designed to receive a frame of signals present on the column conductors 301, and to identify the columns providing signal. A frame of signals is received during an integration period or sampling period. In an embodiment, the receiver (or a signal processor associated with the receiver data) may determine a measure associated with the quantity of each of the orthogonal transmitted signals present on that column conductor 301 during the time the frame of signals was captured. In this manner, in addition to identifying the row conductors 201 in touch with each column conductor 301, the receiver can provide additional (e.g., qualitative) information concerning the touch. In general, touch events may correspond (or inversely correspond) to the received signals on the column conductors 301. For each column conductor 301, the different signals received thereon indicate which of the corresponding row conductors 201 is being touched simultaneously with that column conductor 301. In an embodiment, the amount of coupling between the corresponding row conductor 201 and column conductor 301 may indicate e.g., the area of the surface covered by the touch, the pressure of the touch, etc. In an embodiment, a change in coupling over time between the corresponding row conductor 201 and column conductor 301 indicates a change in touch at the intersection of the two.

The row conductor 201 and column conductor 301 arrangement shown in FIG. 1, as well as the sensing methodologies, provides the framework for the discussion related to self adjusting controls provided below.

Figure 2A:
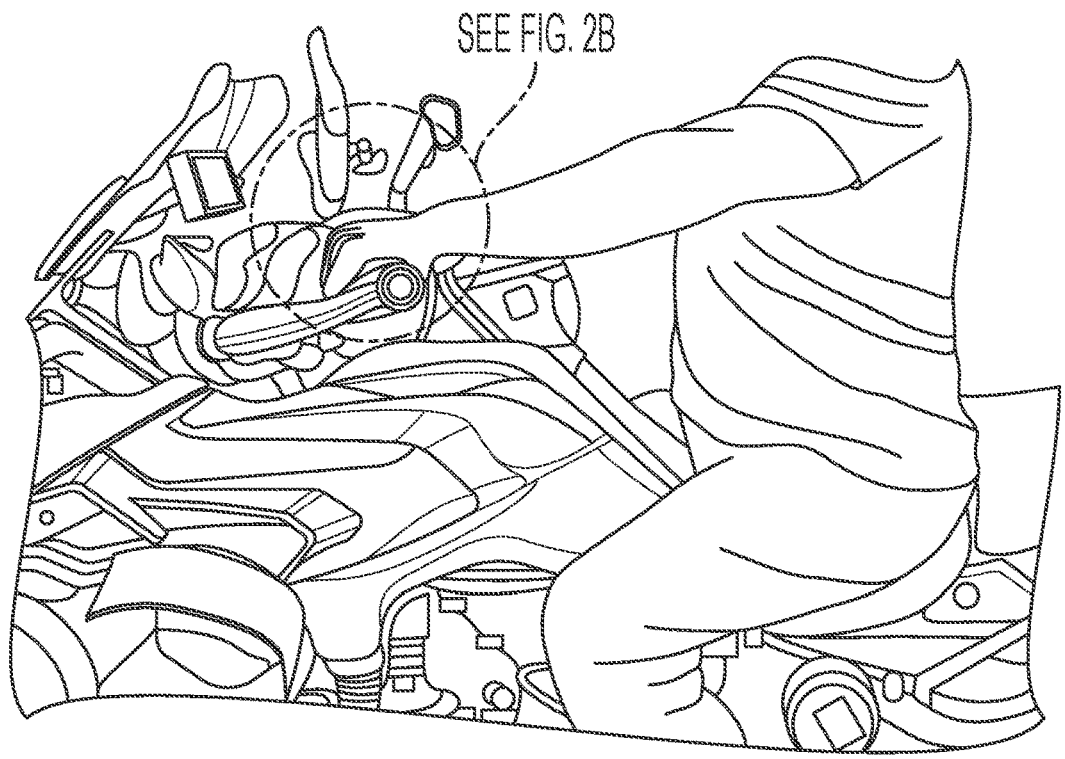
FIG. 2A is a view of a motorcycle rider.
Figure 2B:
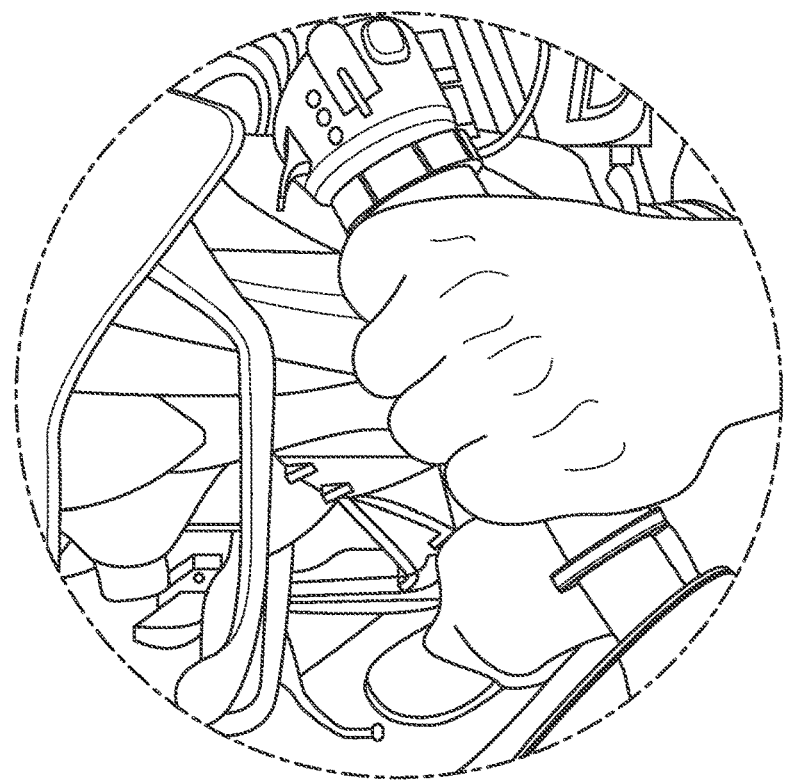
FIG. 2B is a close-up view of a hand placed on the motorcycle handle.
Figure 3A:
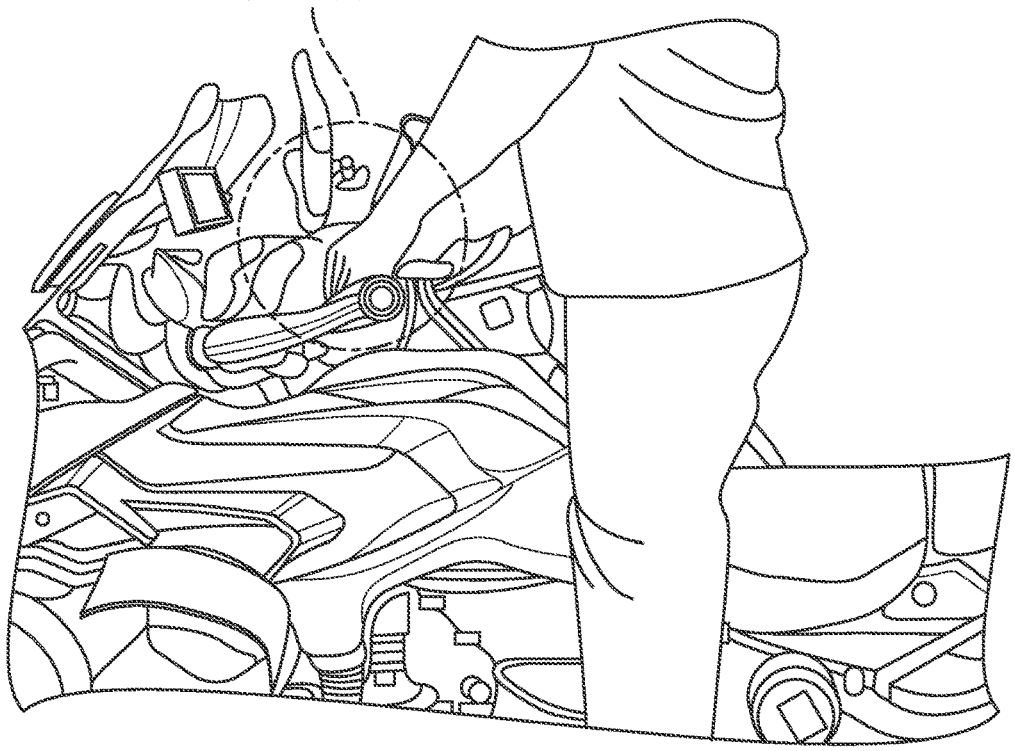
FIG. 3A is another view of the motorcycle rider.
Figure 3B:
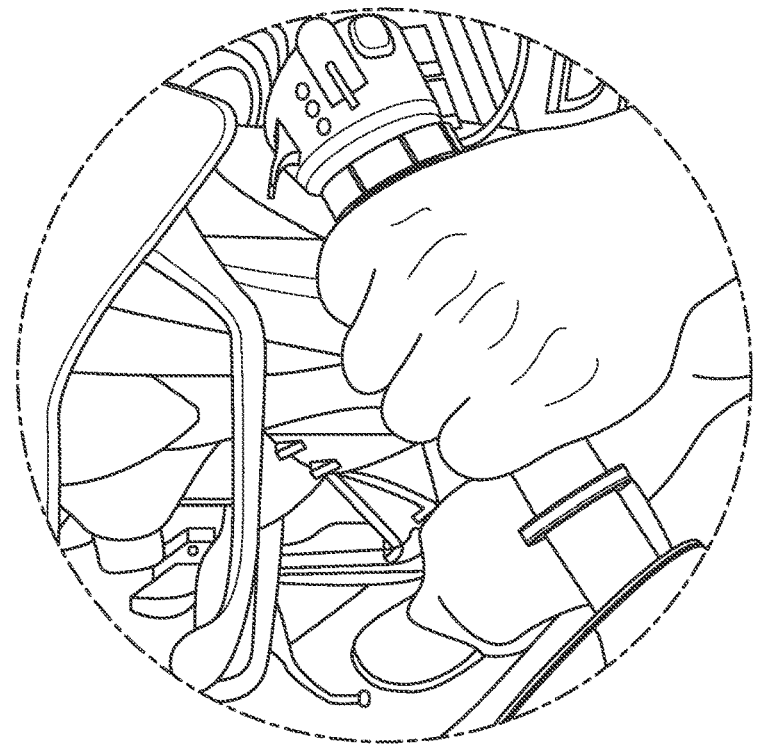
FIG. 3B is a close-up view of the hand position of the user in a different position.

Referring generally to FIGS. 2-15, and in particular to FIGS. 2 and 3, shown are exemplary embodiments of a scenario where position based controls are used. In particular, a scenario where an individual is positioned on a motorcycle is shown. FIGS. 2 and 3 show positioning of hands on the handlebars of a motorcycle.

Still referring to FIGS. 2 and 3, the positioning of the hands on the bars of motorcycle are shown. The positioning of the hands of the user in this scenario are determined based on the positioning of the rider of the motorcycle. The positioning may change based on whether the rider is sitting, as shown in FIG. 2, or standing, as shown in FIG. 3. Regardless of the standing or sitting position of the rider, the rider may desire to access the same controls regardless of his or her position on the motorcycle. Furthermore, some controls may be contextualized to the scenario in which the ride finds themselves. Similarly in a situation where the driver of an automobile is gripping a steering wheel, the same controls may be desired to be accessed regardless of the positioning of the hands of the hands on the steering wheel. Additionally, contextualized controls can be provided depending on how a user's hands are positioned on the steering wheel.

Figure 4:
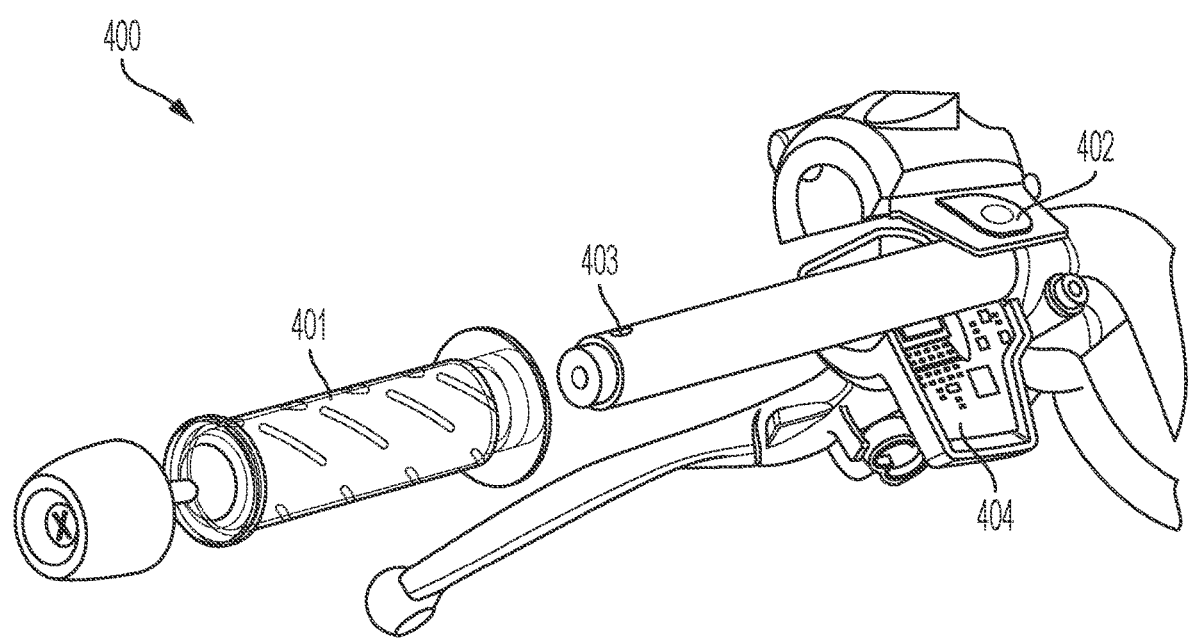
FIG. 4 shows a view of a motorcycle handlebar that implements a sensor system adapted to interpret touch events to generate commands for the operation of the motorcycle.

FIG. 4 shows an embodiment of a sensor system 400 that is adapted to provide positional and contextualized controls for the user of a motorcycle. Handlebar 403 has a sensor 401 placed thereon. In an embodiment, sensor 401 is FMT sensor such as discussed above. In an embodiment, sensor 401 is an overmolded grip that implements an FMT sensor. In an embodiment, the sensor 401 is molded to be formed and placed on the handlebar 403.

In an embodiment, directional pad 402 is further adapted to be placed on the handlebar 403. In an embodiment, the directional pad 402 is both a mechanically operational directional pad and multi-touch directional pad. In an embodiment, the directional pad 402 is only a mechanically operational directional pad. In an embodiment, the directional pad 402 is only a multi-touch direction pad. In an embodiment, no directional pad is needed and all control ability is provided by the sensor 401.

In an embodiment, controller 404 is operably connected to the sensor 401 and the directional pad 402. In an embodiment, controller 404 is only connected to the directional pad 402. In an embodiment controller 404 is operably connected to only the sensor 401. In an embodiment, sensor 401 is operably connected to various controllers operably connected to various components of the motorcycle.

The sensor 401 placed on the motorcycle handlebar 401 has embedded therein transmitting conductors (not shown) and receiving conductors (not shown) within an overmolded grip. In an embodiment, the transmitting conductors and receiving conductors are integrally formed with the grip. In an embodiment, signals are generated by a signal generator or signal generators and transmitted on a transmitting conductor or transmitting conductors. A user interacts with a surface portion of sensor 401 and signals are received by receiving conductors operably connected to a receiver. The signals received are processed by a signal processor operably connected to the receiver. The processed signals are then used in order to recognize touch events and correlate the recognized touch events to control events associated with the motorcycle and devices that may be used with or on the motorcycle. The associated control events can cause various functions to occur with the motorcycle or with devices being carried, located, or otherwise associated with the motorcycle. The devices being carried, located, or otherwise associated with the motorcycle are additionally operably connected to the sensor system 400.

"Control events" are one or more touch events that have been processed and correlated with a function. "Control events" can be functions that are accessible via initial touch events. "Control events" can also be functions that are accessible via subsequent touch events or menus that are accessible after an initial processing of a touch event. "Control events" may further be functions that are accessible via a sequence of touch events or controls events. "Control events" additionally can be functions that are accessible via a touch event that is correlated with the positioning of the user with respect to the sensor.

For example, in an embodiment, a control event is as follows, a first touch event establishes that a user has touched the sensor. The touch of the sensor is processed and the positioning of the user's hand is determined with respect to the touch sensor. The positioning of the user's hand establishes that volume controls should be accessible by the user. Subsequent movement of the user's hand provides control events (which are one or more touch events that have been processed and correlated with a function) that adjust the volume of a device or a system that generates sound.

Figure 5:
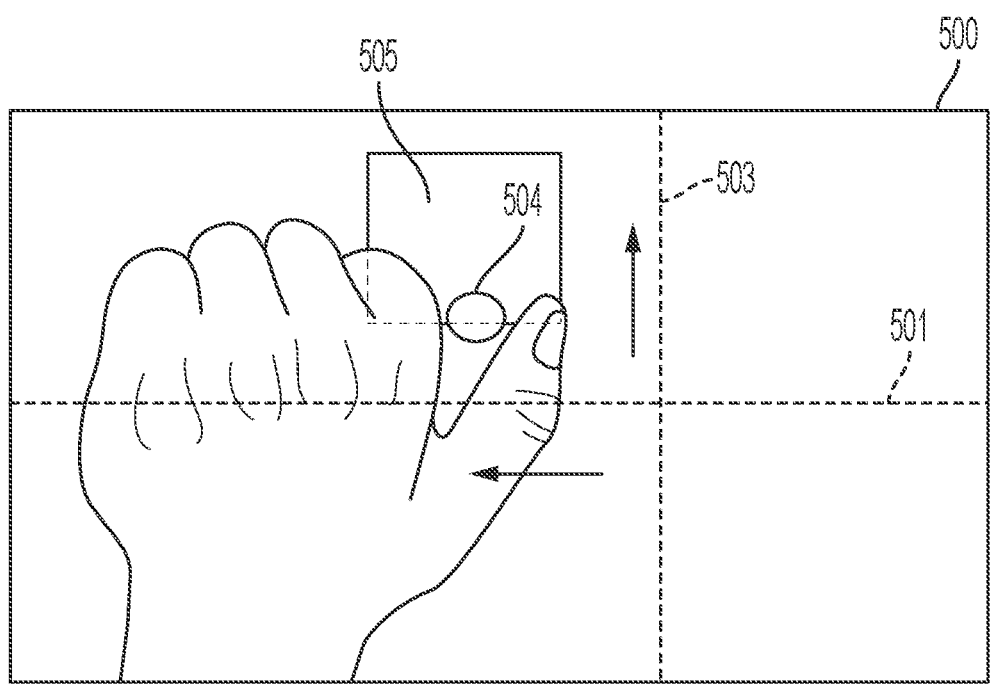
FIG. 5 is a schematic view of the sensor system implemented on the handlebar of a motorcycle.

Turning to FIG. 5, a schematic drawing illustrating an embodiment of an implementation of a sensor 500 is shown. The sensor 500 shown in FIG. 5 is a flat view of the sensor 500 when not wrapped around a handlebar. This view is by way of explanation only and it should be understood that the sensor 500 would encircle or otherwise conform to a handlebar when in use. The sensor 500 when implemented wraps around the handle of the motorcycle and the portion at the top of FIG. 5 wraps around to the portion at the bottom of FIG. 5.

Still referring to FIG. 5, when a hand is placed on the sensor 500, such as when a hand grips a motorcycle handlebar, the location and placement of the hand is detected via the determination of touch events due to interaction with the transmitting conductors and receiving conductors and the signals transmitted thereon. In an embodiment, each of signals transmitting on the transmitting conductors are frequency orthogonal to each other of signals transmitted during an integration period. In an embodiment, at least some of the signals transmitted during an integration period are frequency orthogonal to each other signal transmitted during an integration period.

The heat map generated by the signals received by the sensor 500 and its associated processor is further processed so as to provide coordinates for determining the location of the touch events with respect to the motorcycle. In the embodiment shown in FIG. 5, there is a horizontal axis 501 and the vertical axis 503. The location of the touch events with respect to these axes are used in order to establish the location of the hand with respect to the handlebar. This information is used to provide contextualized information regarding the positioning and movement of the hand with respect to the handlebar during a certain time frame. Furthermore, the nature of the device that is being interacted with can provide contextualized controls. So for example, if the positioning of the hand may change with respect to the sensor in certain situations, but access to the same controls are desired, the predetermined knowledge regarding positioning of a user during different events during the operation of, for example, the motorcycle, is used to further determine the controls of the device.

In an embodiment, other reference areas may be used instead of the axes shown in FIG. 5. In an embodiment, different spots on the heat map can be used as reference points and distance from the different spots can be used. In an embodiment, a circle can be implemented on the heat map and the distance with respect to the circle can be used in order to establish orientation. Depending on the geometry of the object or device on which the sensor is placed the reference points or areas can be modified in order to provide the best orientation for the system. In an embodiment, location on a sphere is determined. In an embodiment, location on a cube is determined. In an embodiment, location on a triangle is determined. In an embodiment, location on another polygonal or amorphous structure is determined by conforming the sensor or sensors to conform to the shape of the object or structure that is going to have contextualized controls.

Still referring to FIG. 5, in an embodiment, features of the hand of a user are used to determine the placement of the hand. For example, the curl of the hand around the handlebar creates distinct features in the context of the hand. The ridge formed by the curl of the hand is able to be determined based on analysis of the heat map. In an embodiment, machine learning algorithms are used to establish the features of a particular user. In an embodiment, features that are generalized across a spectrum of users are used.

Still referring to FIG. 5, the ridge of the curled hand is used as a feature 504 to establish the location of the hand. In FIG. 5, the feature 504 is determined from the generated heat map. The feature 504 is oriented with respect to the horizontal axis 501 and the vertical axis 503. Upon orientation of the feature 504, the control region 505 is located in an area proximate to the feature 504. In an embodiment, the control region 505 is operably located in an area that is accessible to the user for the particular control that is desired to be implemented.

Still referring to FIG. 5, the user interacts with the control region 505. The movement of the control region 505 to the location where the hand is located permits the reduction in responding to the activities of a user by focusing the control logic to process those activities that occur in the control region 505. When the hand of the user moves to a different location on the handlebar and thus to a different location on the sensor 500, the feature 504 is again determined and used to move the control region 505 to that location. The feature 504 and its relationship to the horizontal axis 501 and the vertical axis 502 are used to reorient the control region 505 when the hand moves. While FIG. 5 is shown as one control region, different control events may generate or implement control regions in more than one area. In an embodiment, more than one control region is used for a control event. In an embodiment, control region location changes from integration period to integration period. In an embodiment, the control region is moved to a different location based on the anticipated placement of the user's hand.

Other features may be used instead of the ridge of the hand. For example, in an embodiment, features of individual fingers are used to orient the control region. In an embodiment, the act of touching the sensor is the feature used. In an embodiment, the palm of the hand is the feature used. In an embodiment, all the fingers are the features used. In an embodiment, the wrist is used. Additionally depending upon the implementation of the sensor, those features that are used for providing reference can be other than or in addition to those related to a hand. In an embodiment, features of a foot are used by the sensor. In an embodiment, features of the hand are used. In an embodiment, features of the face are used. In an embodiment, the seating of a person is used to orient the control region. In an embodiment, other features of the body are used for providing orientation of the control. In an embodiment, more than one person's features are used to orient a control region. In an embodiment, a signal is infused into a user and the infused signal assists in orienting the user. In an embodiment, the infused signal is frequency orthogonal to each other signal transmitted during an integration period.

Figure 6:
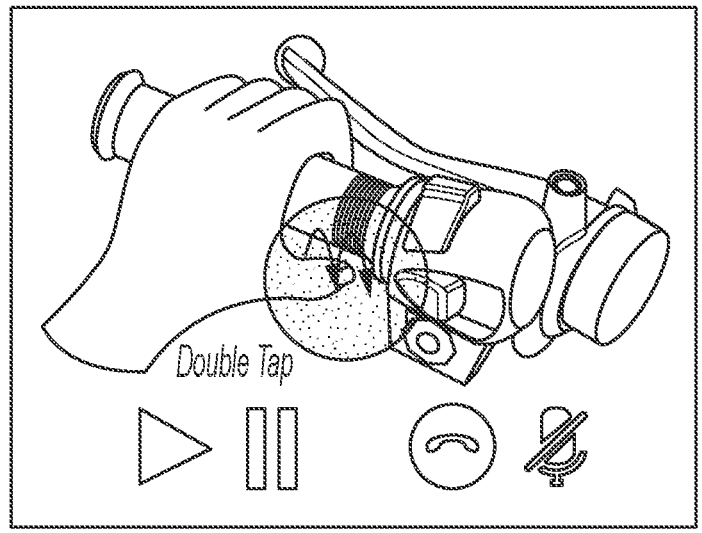
FIG. 6 shows a view of a touch control operation usable with the sensor system shown in FIG. 4.

Some examples of controls that can be accessed and activated via interaction with the sensor system are shown in FIGS. 6-15. FIG. 6 illustrates a control event being the activation of play, pause, call and mute controls when the hand is gripping the motorcycle handlebar via interaction with the sensor. The device being controlled, for example a phone, is part of the vehicle but is instead operably connected to the vehicle.

Figure 7:
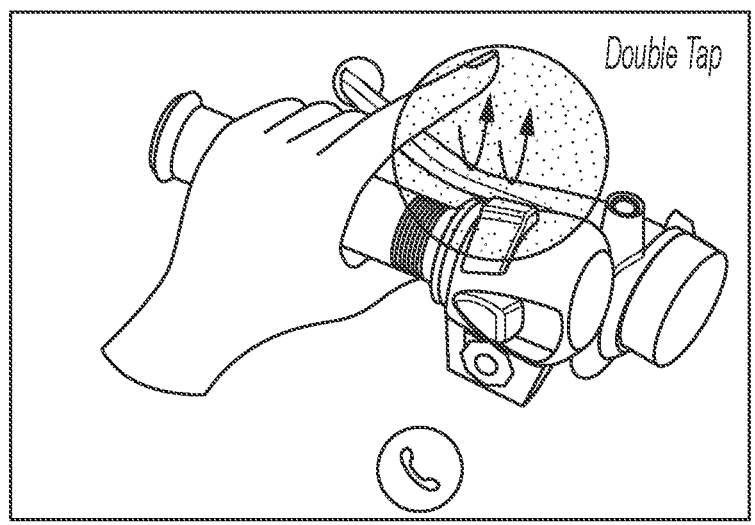
FIG. 7 shows a view of a touch control operation usable with the sensor system shown in FIG. 4.

FIG. 7 illustrates a control event being the subsequent activation of a call using a double tap movement. In FIG. 7 the determination that the finger double tapped a specific portion of the handlebar can be determined by measuring the activity of the finger using the sensor located on the handlebar. In an embodiment, the sensors implemented in the handlebar are able to determine activity that occurs above the handlebar. Additionally, in an embodiment, more than one portion of the handlebar is adapted to determine touch events. Furthermore, in an embodiment, a signal is infused into the user that is additionally able to be detected and measured at other portions of the vehicle.

Figure 8:
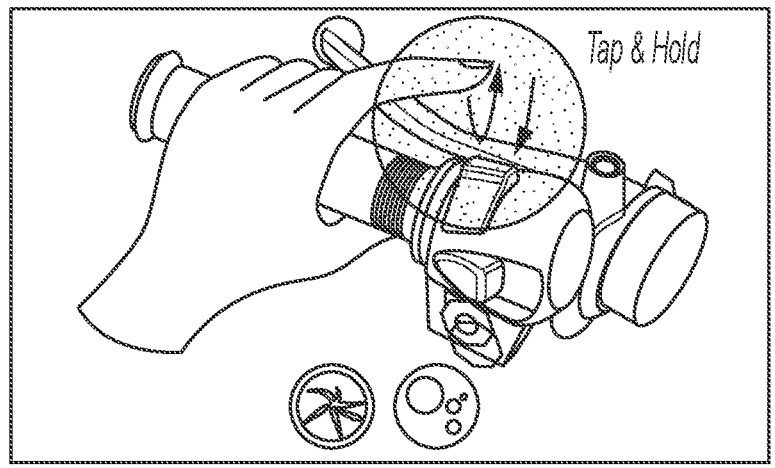
FIG. 8 shows a view of a touch control operation usable with the sensor shown in FIG. 4.
Figure 9:
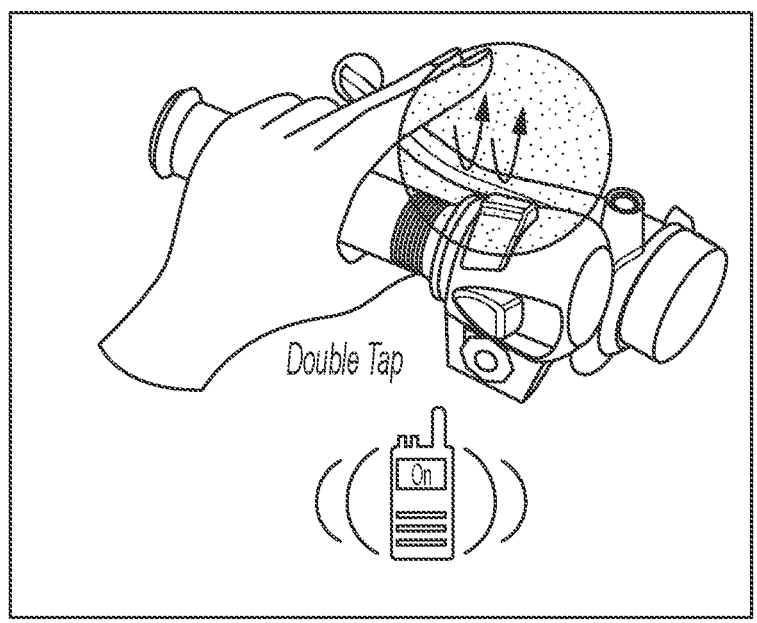
FIG. 9 shows a view of a touch control operation usable with the sensor shown in FIG. 4.
Figure 10:
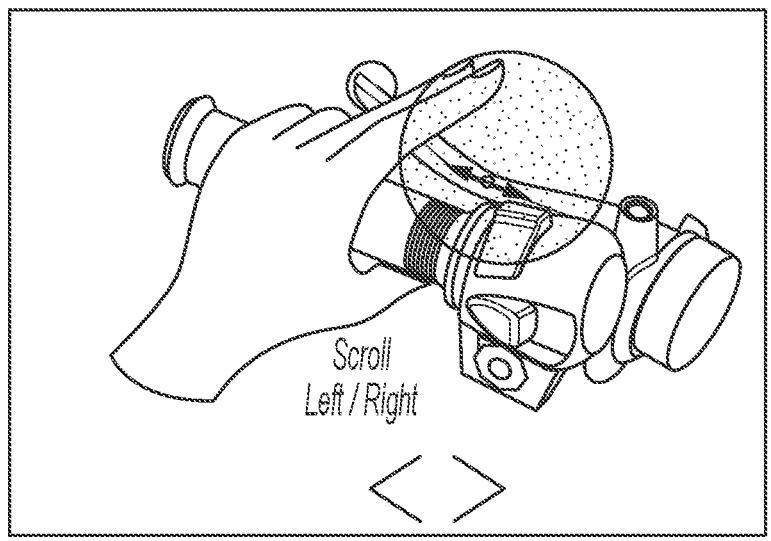
FIG. 10 shows a view of a touch control operation usable with the sensor system shown in FIG. 4.
Figure 11:
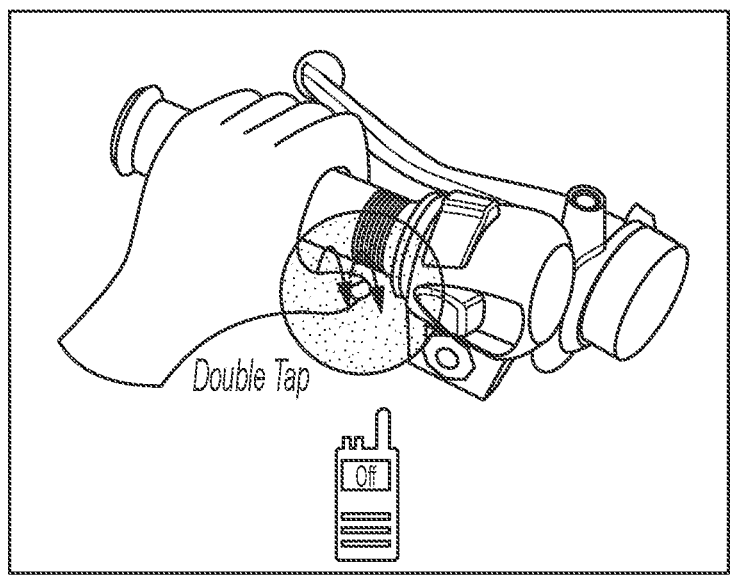
FIG. 11 shows another view of a touch control operation usable with the sensor system shown in FIG. 4.
Figure 12:
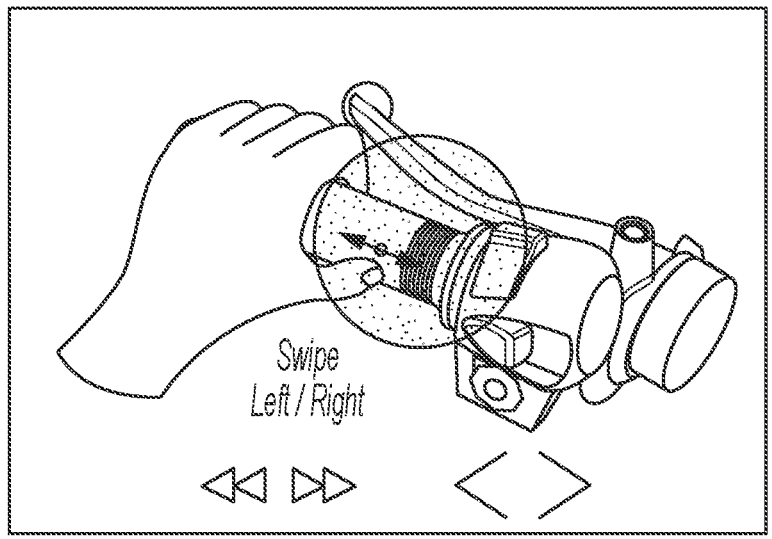
FIG. 12 shows a view of a touch control operation usable with the sensor system shown in FIG. 4.
Figure 13:
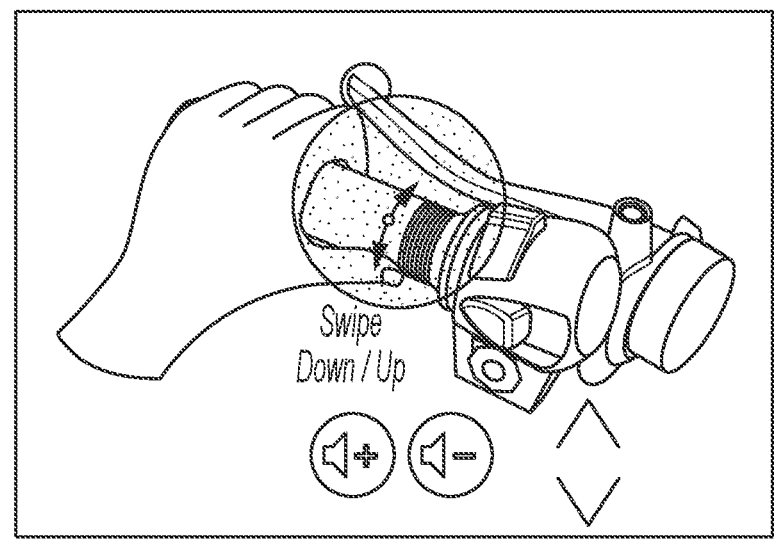
FIG. 13 shows a view of a touch control operation usable with the sensor system shown in FIG. 4.
Figure 14:
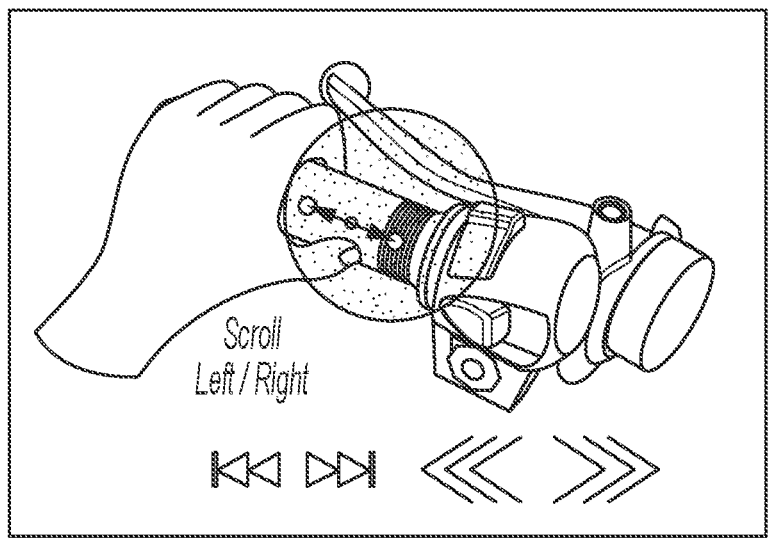
FIG. 14 shows a view of a touch control operation usable with the sensor system shown in FIG. 4.
Figure 15:
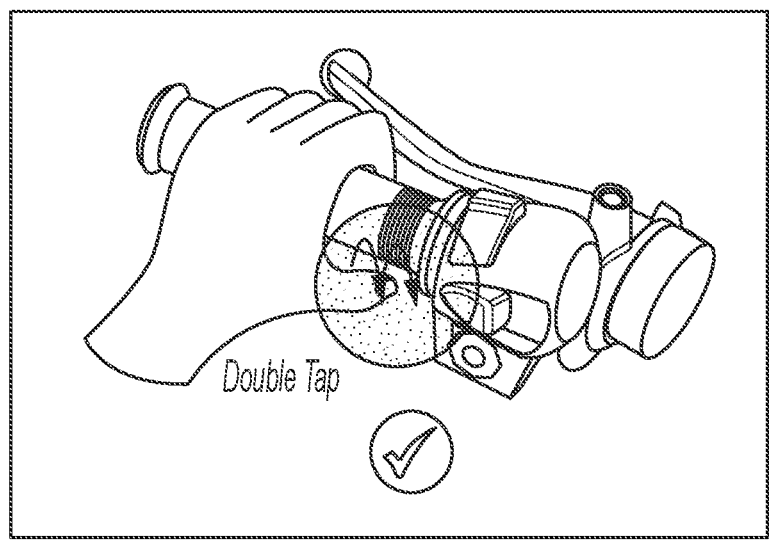
FIG. 15 shows a view of a touch control operation usable with the sensor system shown in FIG. 4.

FIG. 8 illustrates a control event that provides activation of an automated assistant in a manner commensurate with those described above with respect to FIGS. 6 and 7. FIG. 9 illustrates a control event that provides activation of radio or music via interaction with the sensor in a manner commensurate with those described above with respect to FIGS. 6 and 7. FIG. 10 illustrates a control event that provides activation of scrolling features via a sensor in a manner commensurate with those described above with respect to FIGS. 6 and 7. FIG. 11 illustrates a control event that provides deactivation of a radio or music via interaction with a sensor in a manner commensurate with those described above with respect to FIGS. 6 and 7. FIG. 12 illustrates a control event that provides activation of fast forward and reverse commands via a sensor in a manner commensurate with those described above with respect to FIGS. 6 and 7. FIG. 13 illustrates a control event that provides activation of volume controls via a sensor in a manner commensurate with those described above with respect to FIGS. 6 and 7. FIG. 14 illustrates a control event that provides additional activation of scrolling forward and reverse commands via a sensor in a manner commensurate with those described above with respect to FIGS. 6 and 7. FIG. 15 illustrates a control event that provides activation of a confirmation command via a sensor in a manner commensurate with those described above with respect to FIGS. 6 and 7. In the aforementioned control events, the depicted control events can be activated in more than physical location on the handlebar provided the sensor and contextual relationship is there.

The control events of FIGS. 6-15 are implemented upon detection of touch events and subsequent touch events during each integration period. In the instances where there are controls implemented on, for example, the handlebar, the touch event can be the gripping of the handlebar, with that touch event activating control regions that are adapted to permit further touch events. Upon detection of hand gripping a portion of the handlebar, the controller for the sensing system can trigger a list of touch events (control events) that can be activated by the person gripping the handlebar subsequent to the initial gripping of the handle. The control events can then be activated as the user desires via orientation with respect to the handlebar and the user's hand as determined by the initial touch event (e.g gripping of the handlebar by the user's hand).

When the user changes the position of their hand with respect to the sensor. For example by changing from the position shown in FIG. 2 to the position shown in FIG. 3, the sensor is able to determine the new position of the hand based on a predetermined understanding of how the hand will grip the handlebar and how changes with respect to the positioning of the hand on the handlebar will change the orientation. For example, the user could lift their hand and place their hand in the new gripping position, or alternatively slide and move their hand to the new gripping position. Once the sensor system determines that the new gripping position has been established the subsequent control features can be activated based upon the new orientation of the hand. In this manner the subsequent controls are self locating with respect to the object that has the sensor system placed thereon or therein.

In an embodiment, the sensor system with self locating controls are placed on a three dimensional surface such as the handlebars of a motorcycle. In an embodiment, the sensor system with self locating controls are placed on a cube. In an embodiment, the sensor system with self locating controls are placed on a pyramid shaped object. In an embodiment, the sensor system with self locating controls are placed on a cylindrical object. In an embodiment, the sensor system with self locating controls are placed on a polygonal object. In an embodiment, the sensor system with self locating controls are placed on a curved surface. In an embodiment, the sensor system with self locating controls are placed on an amorphous surface. In an embodiment, the sensor system with self locating controls are placed on planar surfaces. In an embodiment, the sensor system with self locating controls are placed on a structure with many surfaces of unequal size.

In an embodiment, the sensor system is placed on the handlebars of a motorcycle. In an embodiment, the sensor system is placed on the steering wheel of an automobile. In an embodiment, the sensor system is placed on the steering wheel of a plane. In an embodiment, the sensor system is placed on the steering mechanism of another vehicle. In an embodiment, the sensor system is placed at multiple locations on the motorcycle. In an embodiment, the sensor system is placed at multiple locations within an automobile, such as the dashboard, interior, etc. In an embodiment, the sensor system is within the cabin of a plane. In an embodiment, the sensor system is placed on the interior of another vehicle.

In an embodiment the sensor system is placed on the surface of a door. For example, a user can place their hand on any portion of a door and then enter a pattern that unlocks the door. In an embodiment, the sensor system is placed on furniture that provides the ability to control functions in the house regardless of where they are seated or positioned. For example, a user could rest their hand on a portion of a chair or sofa and then subsequently control a television or speaker. The controls could be activated regardless of where a user places their hand. In an embodiment, the sensor system is placed on a cube wherein placing one's hand anywhere on the cube can be used to control music or other activities controlled by the controller.

In an embodiment, the sensor system is implemented on sporting equipment. In an embodiment, the sensor system is used to adjust or remove sporting equipment from a storage area. In an embodiment, the sensor system is used to control features of a golf club, such as tilt or angle. Gripping the handle of the club can activate the club's head to change positioning so as to improve a golf swing.

An aspect of the present disclosure is a sensor system. The sensor system comprising: a sensor comprising; a plurality of transmitting conductors adapted to transmit a plurality of signals, wherein each of the plurality of signals transmitted are frequency orthogonal with respect to each other of the plurality of signals transmitted during an integration period; a plurality of receiving conductors adapted to receive signals transmitted from the plurality of transmitting conductors; and a controller operatively connected to the sensor, the controller adapted to process received signals and determine at least one feature from the processed received signals and determine a location of a control region from the determined at least one feature.

Another aspect of the present disclosure is a method for relocating controls. The method comprising determining a first position of a hand on a sensor system, the sensor system comprising; a sensor comprising; a plurality of transmitting conductors adapted to transmit a plurality of signals, wherein each of the plurality of signals transmitted are frequency orthogonal with respect to each other of the plurality of signals transmitted during an integration period; a plurality of receiving conductors adapted to receive signals transmitted from the plurality of transmitting conductors; and a controller operatively connected to the sensor, the controller adapted to process received signals and determine at least one feature from the processed received signals; determining the at least one feature; determining a location of the hand with respect to the sensor based on a position of the at least one feature with respect to a reference point on the sensor; generating a control region based on the position determined from the at least one feature.

The several embodiments discussed above illustrate a variety of systems for implementing self-adjusting controls but are not intended to limit the scope of the claims. Other implementations for sensor systems with self-adjusting controls will become apparent to persons of skill in the art in view of this disclosure, and are thus included within the scope of this disclosure.

While the invention has been particularly shown and described with reference to a preferred embodiment thereof, it will be understood by those skilled in the art that various changes in form and details may be made therein without departing from the spirit and scope of the invention.

The invention claimed is:

1. A sensor system comprising:
   a sensor comprising;
      a plurality of transmitting conductors adapted to transmit a plurality of signals, wherein each of the plurality of signals transmitted are frequency orthogonal with respect to each other of the plurality of signals transmitted during an integration period;
      a plurality of receiving conductors adapted to receive signals transmitted from the plurality of transmitting conductors; and
   a controller operatively connected to the sensor, the controller adapted to process received signals and determine at least one feature from the processed received signals and determine a location of a control region from the determined at least one feature.

2. The sensor system of claim 1, wherein the controller is adapted to relocate the control region upon determining at least one other feature from the processed received signals.

3. The sensor system of claim 1, wherein the controller is adapted to relocate the control region upon processing touch events in the control region.

4. The sensor system of claim 1, wherein the controller is adapted to execute a control event based on the determination of a touch event.

5. The sensor system of claim 1, wherein the controller is adapted to execute control events based on determined features.

6. The sensor system of claim 1, wherein the controller is adapted to process received signals from a location other than the sensor.

7. The sensor system of claim 1, wherein the sensor is located on at least one handlebar of a motorcycle.

8. The sensor system of claim 7, wherein the controller is adapted to relocate the control region based on position of a user of the motorcycle.

9. The sensor system of claim 1, wherein the controller is adapted to control features of a smartphone.

10. The sensor system of claim 1, wherein the plurality of receiving conductors are adapted to receive at least one signal infused into a user.

11. A method for relocating controls comprising;
    determining a first position of a hand on a sensor system, the sensor system comprising;
       a sensor comprising;
          a plurality of transmitting conductors adapted to transmit a plurality of signals, wherein each of the plurality of signals transmitted are frequency orthogonal with respect to each other of the plurality of signals transmitted during an integration period;
          a plurality of receiving conductors adapted to receive signals transmitted from the plurality of transmitting conductors; and a controller operatively connected to the sensor, the controller adapted to process received signals and determine at least one feature from the processed received signals;

determining the at least one feature;

determining a location of the hand with respect to the sensor based on a position of the at least one feature with respect to a reference point on the sensor;

generating a control region based on the position determined from the at least one feature.

12. The method of claim 11, further comprising relocating the control region upon determining at least one other feature.

13. The method of claim 11, further comprising relocating the control region upon processing touch events in the control region.

14. The method of claim 11, further comprising executing a control event based on a touch event.

15. The method of claim 11, further comprising executing control events based on determined features.

16. The method of claim 11, further comprising receiving signals from a location other than the sensor.

17. The method of claim 11, wherein the sensor is located on at least one handlebar of a motorcycle.

18. The sensor system of claim 17, further comprising relocating the control region based on position of a user of the motorcycle.

19. The method of claim 11, further comprising accessing control features of a smartphone using the control region.

20. The method of claim 11, further comprising receiving at least one signal infused into a user.

* * * * *